United States Patent
Sydow et al.

(10) Patent No.: US 11,312,070 B2
(45) Date of Patent: Apr. 26, 2022

(54) PRINT HEAD FOR THREE-DIMENSIONAL PRINTING AND THE PRINT HEAD ASSEMBLY

(71) Applicant: OMNI3D SP. Z O.O, Poznan (PL)

(72) Inventors: Piotr Sydow, Poznan (PL); Tomasz Michalski, Poznan (PL); Piotr Maslej, Skwierzyna (PL); Piotr Nawrocki, Dolsk (PL); Kamil Wojtko, Stare Bojanowo (PL); Krzysztof Kardach, Poznan (PL); Konrad Sierzputowski, Poznan (PL)

(73) Assignee: OMNI3D SP. Z.O.O., Poznan (PL)

( * ) Notice: Subject to any disclaimer, the term of this patent is extended or adjusted under 35 U.S.C. 154(b) by 0 days.

(21) Appl. No.: 16/091,404

(22) PCT Filed: Apr. 3, 2017

(86) PCT No.: PCT/PL2017/050019
§ 371 (c)(1),
(2) Date: Oct. 4, 2018

(87) PCT Pub. No.: WO2017/180002
PCT Pub. Date: Oct. 19, 2017

(65) Prior Publication Data
US 2019/0184633 A1    Jun. 20, 2019

(30) Foreign Application Priority Data

Apr. 11, 2016 (PL) .......................... 416792

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/118* (2017.08); *B29C 64/393* (2017.08); *B29C 67/00* (2013.01); *B33Y 30/00* (2014.12)

(58) Field of Classification Search
CPC ................................................... B29C 64/209
See application file for complete search history.

(56) References Cited

U.S. PATENT DOCUMENTS

2009/0314391 A1    12/2009  Crump et al.
2015/0108687 A1*   4/2015   Snyder ............... B29C 64/20
                                          264/308

(Continued)

FOREIGN PATENT DOCUMENTS

CN    104786510 A      7/2015
CN    205086359 U  *   3/2016

*Primary Examiner* — Jacob T Minskey
*Assistant Examiner* — Jennifer A Kessie
(74) *Attorney, Agent, or Firm* — ALGM LLP; Harry J. Guttman (57) ABSTRACT

The object of the invention is a print head for three-dimensional printing comprising an extrusion assembly (1) functionally coupled to a drive assembly (3), and a nozzle assembly (2), functionally coupled to the extrusion assembly (1), providing filament (10) transfer, wherein there is a cooling assembly (18) disposed between the extrusion assembly (1) and the drive assembly (2), containing a fluid cooling system, comprising an inlet (15), an outlet (17) and a system of cooling ducts (14) disposed inside the cooling assembly (18), distributing the cooling medium (11), providing maintenance of the preset temperature of the extrusion assembly (1) and the drive assembly (3). The object of the invention is also a print head assembly.

13 Claims, 6 Drawing Sheets

(51) Int. Cl.
 *B29C 67/00* (2017.01)
 *B29C 64/393* (2017.01)
 *B29C 64/118* (2017.01)

(56) References Cited

U.S. PATENT DOCUMENTS

2015/0165676 A1 6/2015 Chen et al.
2016/0046073 A1 2/2016 Hadas
2016/0297110 A1 10/2016 Wu

* cited by examiner

PRINT HEAD FOR THREE-DIMENSIONAL PRINTING AND THE PRINT HEAD ASSEMBLY

The object of the invention is a print head for three-dimensional printing and the print head assembly, used in 3D printers working in the Fused Filament Fabrication technology in rapid prototyping applications and short series production, finding application particularly in manufacturing industry, in medicine and prosthetics, education, garment design, in automotive industry, or in a broad range of consumer products and electronics.

3D printing is a process of fabrication of digitally designed three-dimensional objects. Printing in the Fused Filament Fabrication technology is effected by means of depositing consecutive layers into a predetermined shape. In general, the technology consists in delivering a synthetic thermoplastic material strand heated to a semi-liquid state to the print head for three-dimensional printing, moving spatially in three dimensions. The thermoplastic materials (half-products in 3D printing) used for printing in this technology, can be any kind of thermoplastic synthetic material in the form of a strand wound upon a spool, hereinafter referred to as the filament. Filament is applied either in layers or as points, and the deposition process is usually implemented in a chamber providing a temperature enabling thermal forming of the thermoplastic material. The local material temperature immediately upon leaving the nozzle is close to its melting temperature, or sometimes exceeds it. During 3D printing, a critical issue is maintaining an appropriate temperature gradient of the print head, which generally requires the application of appropriate cooling systems. 3D printing can be used in various industries, e.g. architecture, fashion, medicine, electronics.

From U.S. Pat. No. 6,004,124A a rapid prototyping system is known, having a liquefier in the extrusion head, the liquefier being formed of a single piece of thin-wall tubing made of metal, encased in a heating block. The thin-wall tube has an inlet end for receiving a filament and an outlet end for delivering the material in liquid form, heated above the setting temperature. The rapid prototyping system provides a blower introducing air with ambient temperature in order to cool the tubing delivering material to the extrusion head. Cooling is limited only to the filament transport path from the spool to the extrusion head and its task is to provide appropriately low temperature of the filament, protecting it against deformation on its path to the head.

European Patent EP1846912B1 discloses a method of object forming comprising jetting of the first material in order to create a number of layers defining the support structure, followed by the extrusion of the second material to form the object layers, wherein the extruded layer of the object adapts to the internal surface of the support structure. In the disclosed embodiment of the said method of forming objects provides for a build chamber, a controller, a CAD system, a part delivering the material, and a circulation system. The build chamber also includes, among others, the extrusion head that requires maintenance in a constant temperature, higher than the creep temperature of the deposited material. Maintaining a constant temperature of the head is provided by a circulation system comprising, among others, a cooling fan that provides cooled air to the extrusion head through the cooling duct.

From International Patent Application WO2015057886A1, a 3D printer is known for fabrication of three-dimensional objects with a traditional manufacturing technique. The disclosed 3D printer comprises an extrusion assembly with a hot end to heat the material deposited on the substrate. The hot end is movable in the horizontal plane, whereas the substrate is movable in the vertical plane, perpendicular to the plane of movement of the hot end, which shall provide fully spatial three-dimensional movement of the whole system. In one embodiment of the 3D printer referred to, the extrusion assembly is enclosed in a housing having openings and conduits to provide the cooling fluid in order to cool and maintain the desired temperature of the extrusion head hot end.

International Patent Application WO2015127271A1, in turn, discloses a processing head assembly that is coupled to the movable tool holder of a machine tool. The processing head assembly comprises an upper processing head coupled to the movable tool holder having a body defining a socket, and comprises a feed powder port functionally coupled to the body. The processing head assembly also comprises a lower processing head including
a base configured to be releasably coupled to the socket and a nozzle with a nozzle exit orifice. The upper processing head further includes a coolant port coupled to the body and operably coupled to a coolant supply. Whereas the lower processing head includes a coolant interface coupled to the base and configured to detachably couple to the coolant port in the upper processing head. This way, fully functional interchangeability of the lower processing head of the processing head assembly is provided.

During three-dimensional printing of complex printouts, the application of two print heads is preferred. In such case, one print head carries out the proper print, whereas the second one is responsible for printing the so called supports that the printout is based upon. The process of creation of the supports is necessary in case of printouts where the building material is deposited only from a certain height in space, and not straight from the bottom, i.e. from the print bed surface. Performance of some printouts with one head is then impossible. Performance of printouts with two fixed heads is possible, however it does not provide good results due to some adverse phenomena, such as deformation of individual fragments of the printout layer in points of contact with the non-printing hot head—these heads are then at the same height, and pollution of individual fragments of the printout layer in points of contact with the currently non-printing head with e.g. a different color or the support material, the difficulty to obtain a precise and identical position of both heads in relation to the print bed. In some solutions this is connected with the trial performance of these prints and manual introduction of adjustments.

The technical problem faced by this invention is to propose such a print head that will be dedicated for three-dimensional printing, in particularly with the application of the Fused Filament Fabrication technology, wherein the head will provide maintaining the appropriate preset operating temperature, will constitute a modular design providing the interchangeability of the nozzle assembly, and will also provide greater reliability of operation, in particular in an adverse environment of high temperature inside the build chamber. Furthermore, it is desired to provide a print head assembly that will enable implementation of complex printouts with the use of supports, allowing at the same time to avoid deformation of individual elements of the printout layer and contamination of the printout itself, solving, at the same time, the above mentioned technical problems. Unexpectedly, the above technical problem has been solved by the present invention.

The first object of the invention is a print head for three-dimensional printing comprising an extrusion assembly functionally coupled to a drive assembly, and a nozzle assembly functionally coupled to the extrusion assembly, providing filament transfer, characterized in that there is a cooling assembly disposed between the extrusion assembly and the drive assembly, containing a fluid cooling system, comprising an inlet, an outlet and a system of cooling ducts disposed inside the cooling assembly, distributing the cooling medium, providing maintenance of the preset temperature of the extrusion assembly and the drive assembly. Preferably, there is a cooling chamber made in the extrusion assembly, connected with the cooling ducts of the cooling assembly, surrounding the shaft of the drive assembly. In a preferred embodiment of the invention, the cooling ducts are disposed in a plane adjacent to the drive assembly. In another preferred embodiment of the invention, the cooling system further comprises an external pump and an external heat exchanger, preferably a radiator. In another preferred embodiment of the invention, the cooling system further comprises a temperature sensor being an element of the cooling system control system. Equally preferably, the nozzle assembly comprises a heating element heating the filament to the temperature above the melting point. In a preferred embodiment of the invention, the drive assembly is a stepper motor. In another preferred embodiment of the invention, the extrusion assembly further comprises a rack driven by the drive assembly, and a clamp for the filament transfer. In another preferred embodiment of the invention, the nozzle assembly is coupled to the extrusion assembly with an interface providing detachable connection of the extrusion and the nozzle assemblies.

The second object of the invention is a print head assembly comprising at least two print heads for three-dimensional print, mounted on a mechanism providing independent vertical movement of the print heads, characterized in that at least one of the print heads is a print head as defined in the first object of the invention. In a preferred embodiment of the invention, the mechanism providing independent vertical movement of the print heads comprises a bumper, a carriage rail mounted on a support plate, a return spring, a carriage, a carriage plate that the printer head is attached to, a head position detection system and a servo. In another preferred embodiment of the invention, the head position detection system contains a linear potentiometer with a measuring stylus and a stylus bumper.

The print head for three-dimensional printing according to the present invention constitutes a modular solution, thus enabling fast and easy replacement of the nozzle assembly and by the same adapting the whole apparatus to three-dimensional printing using specific thermoplastic materials and specific forms/shapes of the finished printouts. Liquid cooling implemented in the cooling assembly provides temperature stabilization for the whole print head even during operation in variable temperature conditions in the build chamber. Furthermore, the disposition of the cooling ducts in the cooling assembly also provides cooling of the drive assembly, therefore, in case of its implementation with a stepper motor, the loss of motor steps, thus irregular and uncontrolled filament feed, can be avoided, which might otherwise result in deterioration of the product quality. Providing a cooling chamber in the extrusion assembly, surrounding the drive shaft of the drive assembly, further increases the effectiveness of cooling the complete head and provides the required temperature uniformity throughout its volume, and additionally further evacuates the heat in the critical area of the print head. Enclosing the cooling ducts in a separate cooling assembly also provides interchangeability of this assembly and the adaptation of the disposition of channels to the preset working conditions, which decides on the universality of the solution. Furthermore, the print head assembly according to the present invention comprises two print heads, one of which moves perpendicular to the print bed in relation to the other in a controlled and precise manner. The measured displacements are used to adjust the position of the print bed relative to the currently printing print head. Furthermore, the implemented print head position detection system enables mutual vertical movement of the print heads, precise determination of each print head position, direct measurement for each print head by means of a single sensor, and automatic leveling of the print bed. The print head assembly constitutes a mechatronic system, implementing the movement of those print heads in a plane perpendicular to the plane of the print bed, which allows precise positioning of those print heads relative to the print bed, thus more accurate double head printing.

Exemplary embodiments of the invention have been presented in the drawings, wherein FIG. 10 illustrates a rear side view of the print head assembly comprising two cooperating print heads, of which one is active and ready to print whereas

EXAMPLE 1

Figure 1:
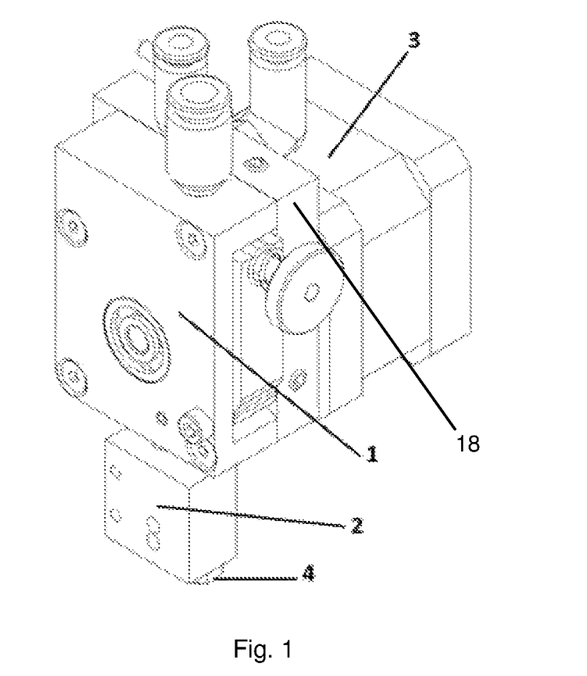
FIG. 1 represents the print head for three-dimensional print according to one embodiment of the present invention, in axonometric projection.
Figure 3:
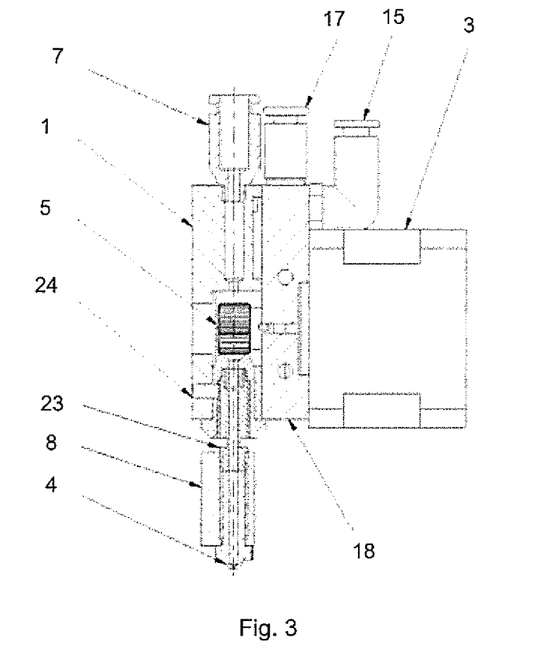
FIG. 3 illustrates a partial longitudinal section of the print head of FIG. 1 in front view.
Figure 4:
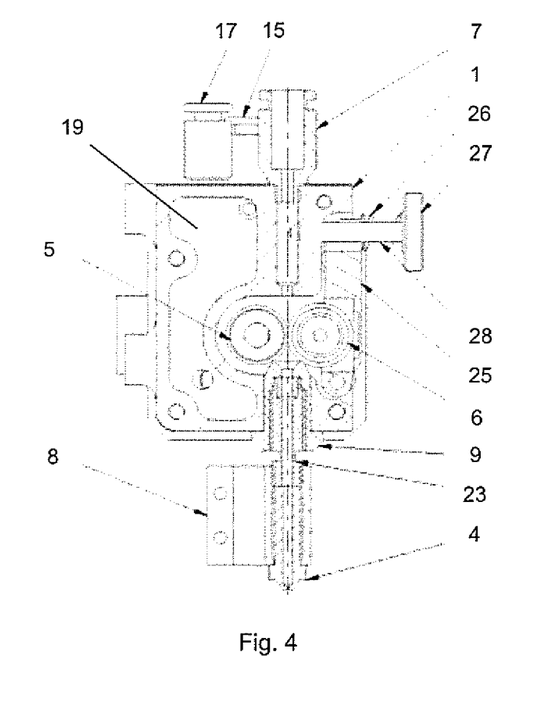
FIG. 4 illustrates a partial longitudinal section of the print head of FIG. 1 in the opposite side view.
Figure 5:
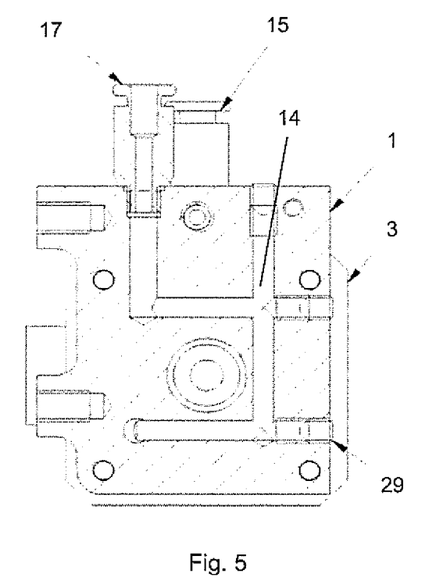
FIG. 5 illustrates a partial longitudinal section of the print head of FIG. 1 in front view, made along another section plane.

FIG. 1 represents the print head for three-dimensional print according to one embodiment of the present invention, in axonometric projection, FIGS. 3, 4, and 5 illustrate cross-sections of the print head of FIG. 1 in various views. The print head is art element intended for adjusting the temperature of filament 10 deposited in the build space during the printing process. While the 3D printer is running, the print head is situated inside the build space in the form of a heated build chamber where high temperature is maintained, adapted to the specific filament and ensuring keeping relevant properties of the printed object, e.g. elimination of contraction effect, preventing delamination, etc. (the temperature inside the chamber can reach up to 70° C.). Exposure of the whole print head to high temperatures can result in the loss of precision control in filament 10 extrusion, thus the quality of the fabricated three-dimensional objects. The print head according to one embodiment of the present invention comprises an extrusion assembly 1 coupled with a nozzle assembly 2 and an attached drive assembly 3 in the form of a stepper motor. Due to the necessity to maintain the appropriate temperature gradient inside the extrusion assembly 1, required by the specificity of three-dimensional printing in the given technology (feeding-melting-extrusion), cooling the whole extrusion assembly 1 became necessary. Furthermore, maintaining the whole print head in the build chamber where high temperature prevails may cause excessive heating of the stepper motor 3, driving the rack 5, which results in the phenomenon of losing the motor 3 steps, thus irregular and uncontrolled filament 10 feed, which results in reduced printout quality. Movement of filament 10 and its extrusion is forced by the rack 5 driven by the stepper motor 4 and the clamp 6 situated in the clamp body 25 (FIG. 4). In the present embodiment of the invention, the filament 10 clamping is implemented by a nut adjusting the pressure force 27, clamp adjusting spring 26 and a seated threaded rod 28 (visible in FIG. 4). Filament 10 is taken from a spool (not shown) and fed be means of hoses and connector 7 into the extrusion assembly 1 body. Passing through the rack 5 and the clamp 6 in the extrusion assembly 1, it is directed to the nozzle assembly 2 where it is melted by means of a heating element 8, and then, due to the movement of the whole print head, through the exit orifice 4 in the nozzle assembly 2, it is placed in the build space forming the printed object on the print bed.

Figure 2:
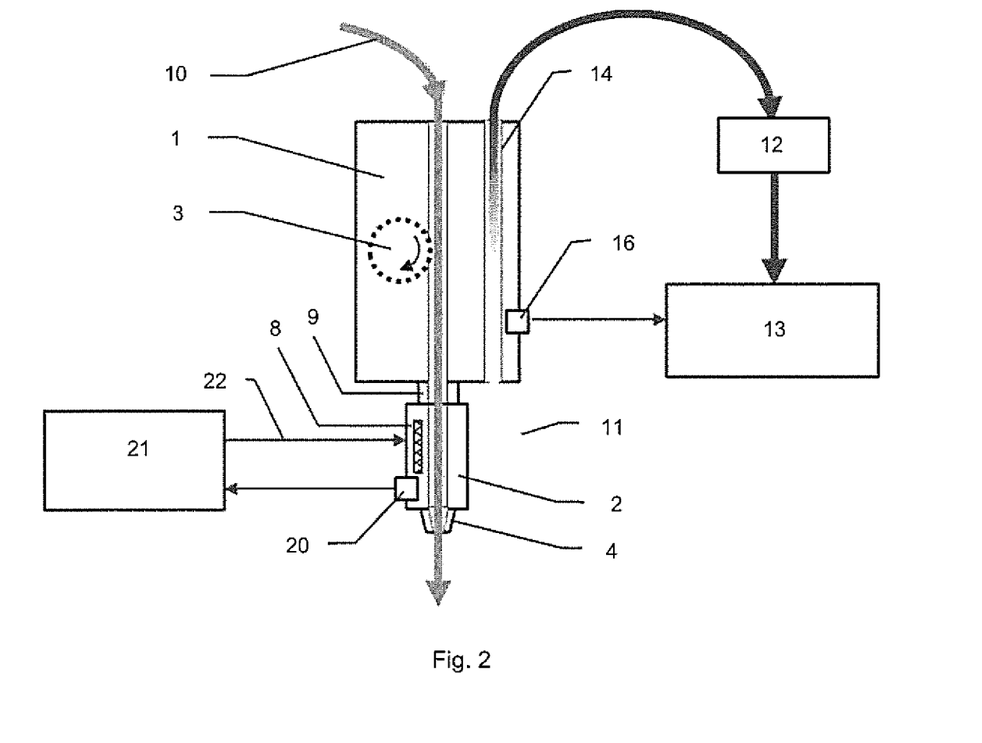
FIG. 2 illustrates a simplified concept diagram for the print head of FIG. 1.
Figure 6:
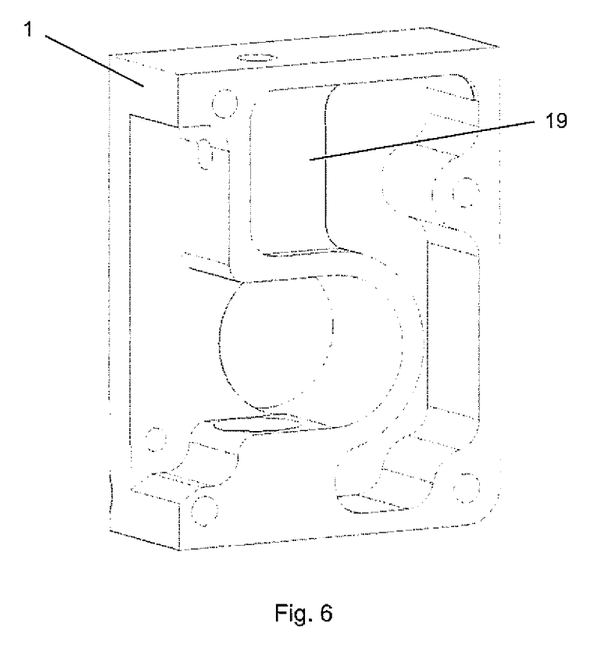
FIG. 6 illustrates the axonometric projection of the print head extrusion assembly body.
Figure 7:
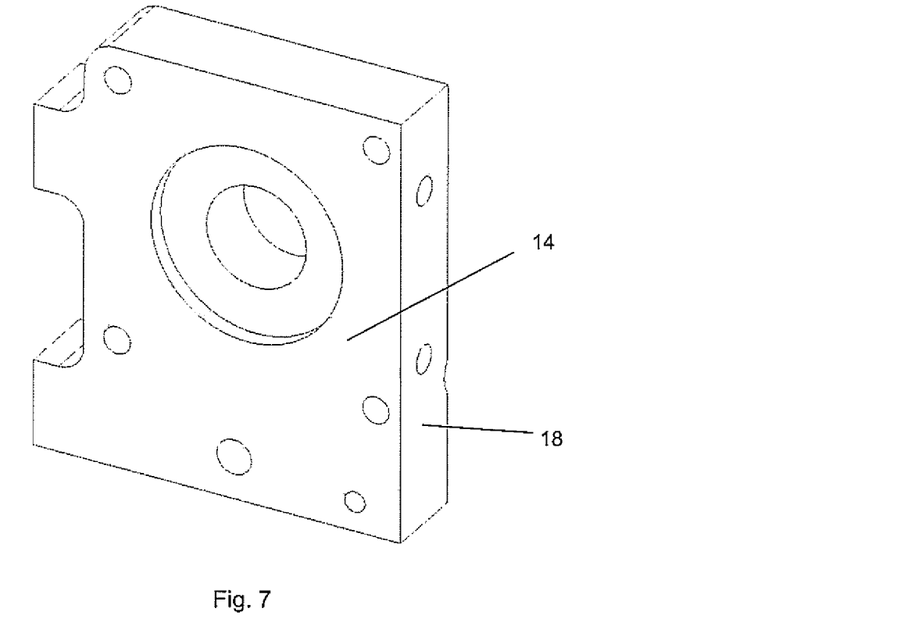
FIG. 7 illustrates the axonometric projection of the print head cooling assembly body.
Figure 8:
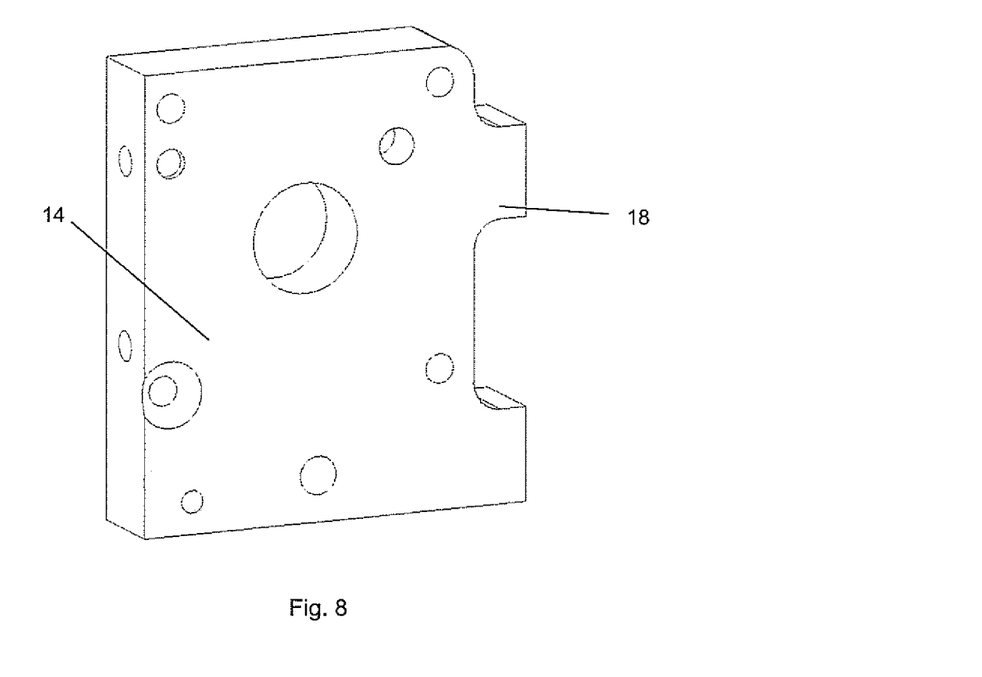
FIG. 8 illustrates another axonometric projection of the print head cooling assembly body.

The print head is equipped with a system for rapid nozzle assembly exchange 2 with a heating element 8 due to the implementation of a specific connector element 9 that, in the present embodiment of the invention, takes the shape of a sleeve 23 situate in the axis of the fed filament 10, blocked by means of a clamp screw 24. Due to the fact that the print head is situated in the build space of the printing apparatus, being exposed to the change in temperatures resulting in loss of control over filament 10 extrusion, between the extrusion assembly 1 and the stepper motor 3 a cooling assembly 18 is implemented that constitutes the temperature control and stabilization system be means of a cooling medium 11 pumped by a pump 12, and a cooling ducts 14 system running around the structure of the said cooling assembly 18, cooperating with a heat exchanger 13 (e.g. a radiator) and a set of pipes with coolant (not shown). FIG. 2 illustrates a simplified concept diagram for the print head equipped with a cooling assembly. Cooling ducts 14 (shown only conceptually) situated inside the print head cooling assembly 18 have been implemented in the print head. An example of the cooling ducts 14 arrangement in the cooling assembly 18 is also illustrated in the cross-section shown in FIG. 5. FIG. 6 presents the extrusion assembly 1 body without the additional equipment, in an axonometric view, with the cooling chamber 19 indicated. FIG. 7 and FIG. 8 illustrate axonometric views of the cooling assembly 18 with a schematic outline of the cooling ducts 14. The cooling ducts 14 are made in the form of holes drilled in the cooling assembly 18 body that the stepper motor 3 is attached to on the one side, and the extrusion assembly 1 on the other. The holes are drilled in such a way that they intersect inside the body of the cooling assembly 18. Then, by plugging some of the wholes with screws (e.g. screw 29 in FIG. 5), one common duct is formed around the opening that the stepper motor 3 shaft passes through. The duct is situated in such a way that the flowing fluid 11 cools the face of the stepper motor 3. The cooling fluid 11 flows on to the extrusion assembly 1 body, and then enters the cooling chamber 19, cooling the whole extrusion assembly 1 (larger surface of heat transfer), cooling, in particular, the place where the connector sleeve is attached. The heat coming from the heating element 8 of the nozzle assembly 2 can also cause heating of the extrusion assembly 1 body, but the cooling liquid 11 flowing near the connector receives that heat. Then the cooling liquid 11 leaves the extrusion assembly 1 body by means of the connector 17, via a tubing to the cooling system.

A mixture of water (about 50%) with HAVOLINE XLC by Texaco (based on ethylene glycol, organic acids and a set of enhancing additives) was used as the cooling medium 11. The cooling ducts 14 distributing the medium 11 are responsible for cooling both the stepper motor 3, and the extrusion assembly 1 as a whole, and the connection element 9. The cooling system consists of a pump 12, a radiator 13, cooling ducts 14, tubings (not shown) and a cooling chamber 19. The cooling medium 11 in the form of liquid is pumped via the tubings from the pump 12 to the radiator 13 where it gets cooled. Next, it is transferred via the tubings running to the connector 15 attached to the extrusion assembly 1 of the print head. Optionally, there is a temperature sensor 16 in the extrusion assembly 1, controlling the operation of the pump 12 by varying its output presets accordingly. Having traveled around the cooling assembly 18 of the print head, the heated medium 11 returns and leaves that extrusion assembly 1 via the connector 17, and then back to the pump 12 via the tubings. FIG. 2 furthermore illustrates the extrusion temperature control system consisting of a temperature sensor 20, extrusion temperature adjustment control 21 that sends a control signal 22 to a heating element 8.

Figure 9:
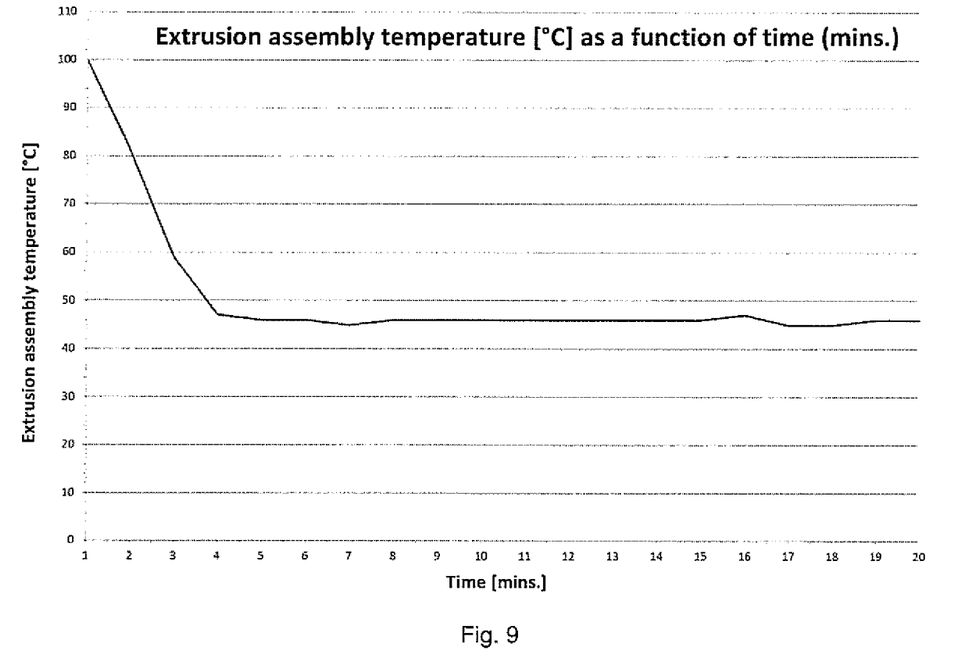
FIG. 9 represents the temperature graph for the print head for three-dimensional print according to one embodiment of the present invention, in function of time.

Tests have been carried out confirming the effectiveness of the implemented cooling system for the extrusion assembly 1 of print head installed in a closed environment of three-dimensional printing. The print head comprising an extrusion assembly 1, a nozzle assembly (2), a cooling assembly 18 and a stepper engine 4, was placed in a build space of the three-dimensional printing system heated up to the temperature of about 80° C. After heating the nozzle assembly 2 to the temperature of about 250° C. and fixing the temperature in the cooling system, the circulation of the cooling medium 11 was started with the following parameters: flow 0.2 m$^3$/min. and pressure of 0.2 atm. The temperature sensor 16 installed inside the extrusion assembly 1 of the print head registered and transmitted the extrusion assembly 1 temperature values in the function of time. The results of the measurements are illustrated in temperature chart for the extrusion assembly 1 of the three-dimensional printer in the function of time, as illustrated in FIG. 9. The presented measurement results show that, for the preset parameters, the presented cooling system lowered the temperature of the print head extrusion assembly from 100° C. to about 46° C. over 4 minutes, and then effectively maintained it.

EXAMPLE 2

Figure 10:
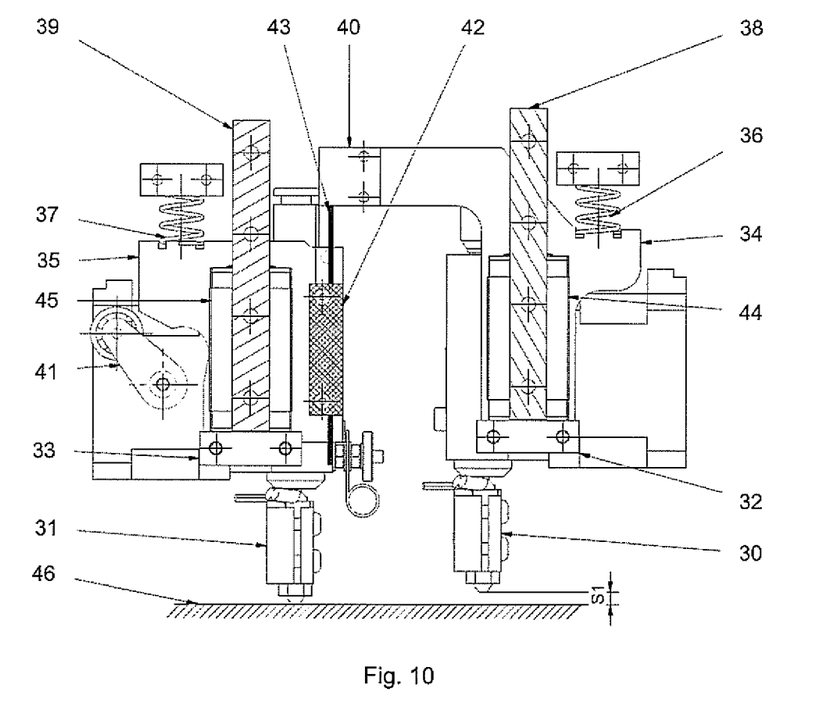
Figure 11:
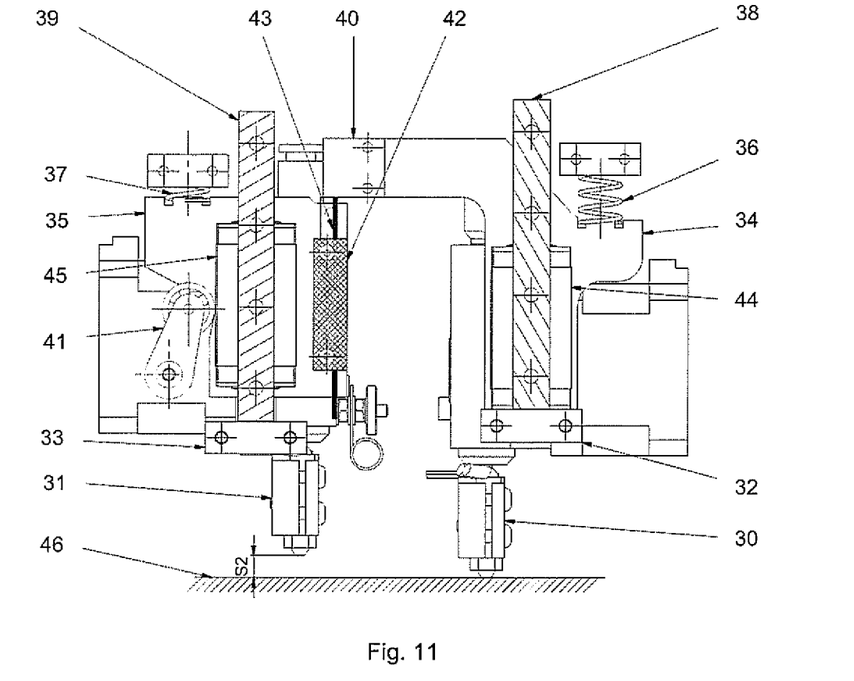
FIG. 11 illustrates a rear side view of the print head assembly comprising two cooperating print heads, of which the other is active and ready to print.

FIGS. 10 and 11 illustrate a print head assembly constituting an embodiment of the second object of the present invention. The presented print head assembly enables execution of complex printouts with the application of supports. Two cooperating print heads 30, 31 structurally substantially similar to the print head presented in the first embodiment are implemented in this assembly, and the whole print head assembly constitutes a mechatronic system that enables execution of 3D printing in optimum conditions. The assembly comprises, as illustrated in FIG. 10, elements such as bumpers 32, 33, carriage rails 38, 39 that are attached to the support plate (not shown) and remain static in relation to each other. Further elements in the assembly are the return springs 36 and 37 of the print heads, print head carriages 44, 45 and the print head carriage plates 34 and 35 that the print heads 30, 31 are attached to. A linear potentiometer 42 with a linear potentiometer stylus 43, supported on the stylus bumper 40, is implemented to read the relative position of those print heads 30, 31. The element exerting pressure and movement of one print head 30 in relation to the other print head 31 is the print bed 46 that while moving upwards causes the movement of one print head 30, and the displacement is measured by means of a linear potentiometer 42. The pressure upon the linear potentiometer 43 stylus is transmitted via print head 30 or 31. The measurement of the print head 30 position in FIG. 11 takes place when the servo (not shown) lifts the print head 31 with the servo arm 41, whereas the measurement of print head 31 is performed when the print head 31 is in a position lower than the print head 30, which is illustrated in FIG. 10. This measurement is used for later adjustment of the print bed 46 position, that adapts its height to the active print head 30 or 31. Such solution provides a safe distance of the inactive print head from the print layer deposited by the active print head. The safe distance is defined in FIG. 10 as value S1, and it is the safe distance for print head 30, whereas value S2 indicates the safe distance for print head 31, which is illustrated in FIG. 11. The system also allows to level the print bed 46.

The invention claimed is:

1. A print head for three-dimensional printing comprising an extrusion assembly (1) functionally coupled to a drive assembly (3), and a nozzle assembly (2), functionally coupled to the extrusion assembly (1), providing thermoplastic filament (10) transfer, characterized in that there is a cooling assembly (18) disposed between the extrusion assembly (1) and the drive assembly (3), containing a fluid cooling system, comprising an inlet (15), an outlet (17) and a system of cooling ducts (14) disposed inside the cooling assembly (18), distributing the cooling medium (11), providing maintenance of the preset temperature of the extrusion assembly (1) and the drive assembly (3), wherein the cooling fluid is a cooling liquid and the extrusion assembly (1) comprises a rack (5) driven by the drive assembly (3).

2. The print head according to claim 1, characterized in that there is a cooling chamber (19) made in the extrusion assembly (1), connected with the cooling ducts (14) of the cooling assembly (18), surrounding the shaft of the drive assembly (3).

3. The print head according to claim 1, characterized in that the cooling ducts (14) are disposed in a plane adjacent to the drive assembly (3).

4. The print head of claim 1, characterized in that the cooling system further comprises an external pump (12) and an external heat exchanger (13).

5. The print head of claim 1, characterized in that the cooling system further includes a temperature sensor (16) constituting a part of the cooling system control system.

6. The print head of claim 1, characterized in that the nozzle assembly (2) comprises a heating element (8) heating the filament (10) to the temperature above the melting point.

7. The print head of claim 1, characterized in that the drive assembly (3) constitutes a stepper motor.

8. The print head of claim 1, characterized in that the extrusion assembly (1) further comprises a clamp (6) to transport the filament (10).

9. The print head of claim 1, characterized in that the nozzle assembly (2) is coupled to the extrusion assembly (1) by means of a connector (9) providing a detachable connection of assemblies (1) and (2).

10. A print head assembly comprising at least two print heads (30, 31) for three-dimensional printing, mounted on a mechanism providing independent vertical movement of the print heads (30, 31), characterized in that at least one of the print heads (30, 31) is a print head as defined in claim 1.

11. The print head assembly according to claim 10, characterized in that a mechanism providing independent vertical movement of the print head (30, 31) comprises a bumper (32, 33), a carriage rail (38, 39) mounted on a support plate, a return spring (36, 37), a carriage (44, 45), a carriage plate (34, 35) that the print head (30, 31) is attached to, a head position detection system and a servo.

12. The print head assembly according to claim 11, characterized in that the head position detection system contains a linear potentiometer (42) with a measuring stylus (43) and a stylus bumper (40).

13. The print head of claim 1, characterized in that the cooling system further comprises an external pump and a radiator.

* * * * *